US010370271B2

United States Patent
Tripathy et al.

(12) United States Patent
(10) Patent No.: US 10,370,271 B2
(45) Date of Patent: Aug. 6, 2019

(54) COLUMN THICKENER AND A PROCESS THEREOF FOR DEWATERING OF IRON ORE SLURRY

(71) Applicant: Council of Scientific and Industrial Research, New Delhi (IN)

(72) Inventors: Alok Tripathy, Bhubaneswar (IN); Surendra Kumar Biswal, Bhubaneswar (IN); Ashok Kumar Sahu, Bhubaneswar (IN)

(73) Assignee: Council of Scientific and Industrial Research, New Delhi (IN)

( * ) Notice: Subject to any disclaimer, the term of this patent is extended or adjusted under 35 U.S.C. 154(b) by 149 days.

(21) Appl. No.: 15/552,641

(22) PCT Filed: Feb. 23, 2016

(86) PCT No.: PCT/IN2016/050063
§ 371 (c)(1),
(2) Date: Aug. 22, 2017

(87) PCT Pub. No.: WO2016/135750
PCT Pub. Date: Sep. 1, 2016

(65) Prior Publication Data
US 2018/0037481 A1 Feb. 8, 2018

(30) Foreign Application Priority Data
Feb. 23, 2015 (IN) ............................ 503/DEL/2015

(51) Int. Cl.
*B03C 1/01* (2006.01)
*B03C 1/28* (2006.01)
(Continued)

(52) U.S. Cl.
CPC ................ *C02F 1/488* (2013.01); *B03C 1/01* (2013.01); *B03C 1/032* (2013.01); *B03C 1/0335* (2013.01);
(Continued)

(58) Field of Classification Search
None
See application file for complete search history.

(56) References Cited

U.S. PATENT DOCUMENTS 2,088,364 A * 7/1937 Ellis ........................ B03C 1/025 209/214
2,902,153 A * 9/1959 Green ....................... B03C 1/32 209/172.5
(Continued)

FOREIGN PATENT DOCUMENTS

WO WO-2016135750 9/2016

OTHER PUBLICATIONS

"International Application No. PCT/IN2016/050063, International Search Report and Written Opinion dated Jul. 13, 2016", (dated Jul. 13, 2016), 9 pgs.

*Primary Examiner* — Krishnan S Menon
(74) *Attorney, Agent, or Firm* — Schwegman Lundberg & Woessner, P.A.

(57) ABSTRACT

The present invention is related to a high aspect ratio column thickener and a process thereof useful for dewatering of iron ore tailings. The column thickener has been developed with multiple feed inlet points and an auxiliary inlet point for water to clear the jam of high concentration slurry, if required. The column also consists of a conical portion at the bottom. Magnetic field has been applied using induced magnetic coil just above the conical portion of column thickener. Iron ore tailings slurry is fed into the column
(Continued)

thickener and particles are allowed to settle in axial direction with and without the application of magnetic field.

8 Claims, 5 Drawing Sheets

(51) Int. Cl.

| | |
|---|---|
| ***B03C 1/32*** | (2006.01) |
| ***C02F 1/48*** | (2006.01) |
| ***C02F 1/52*** | (2006.01) |
| ***C22B 1/00*** | (2006.01) |
| ***B03C 1/032*** | (2006.01) |
| ***B03C 1/033*** | (2006.01) |
| ***C02F 11/12*** | (2019.01) |
| ***C02F 11/14*** | (2019.01) |
| ***C02F 101/20*** | (2006.01) |
| ***C02F 103/10*** | (2006.01) |

(52) U.S. Cl.

CPC ................ *B03C 1/288* (2013.01); *B03C 1/32* (2013.01); *C02F 1/5281* (2013.01); *C02F 11/12* (2013.01); *C02F 11/14* (2013.01); *C22B 1/00* (2013.01); *C02F 2101/203* (2013.01); *C02F 2103/10* (2013.01)

(56) References Cited

U.S. PATENT DOCUMENTS

| | | | | |
|---|---|---|---|---|
| 2,931,720 | A * | 4/1960 | De Vaney ................. C22B 1/02 266/140 | |
| 4,034,667 | A * | 7/1977 | Cartwright ............ B44B 5/0052 101/27 | |
| 4,054,513 | A * | 10/1977 | Windle ................... B03C 1/027 209/214 | |
| 4,356,093 | A | 10/1982 | Abercrombie, Jr. et al. | |
| 6,855,262 | B2 | 2/2005 | Nyman et al. | |
| 7,235,182 | B2 | 6/2007 | Taylor et al. | |
| 7,591,946 | B2 | 9/2009 | Taylor | |
| 7,841,475 | B2 * | 11/2010 | Ricardo ................ B03C 1/0332 209/223.2 | |
| 2002/0157992 | A1 * | 10/2002 | McGaa .............. B01D 21/0009 209/39 | |
| 2004/0168991 | A1 | 9/2004 | Nyman et al. | |
| 2005/0035030 | A1 * | 2/2005 | Oder ...................... B01D 35/06 209/232 | |

* cited by examiner

COLUMN THICKENER AND A PROCESS THEREOF FOR DEWATERING OF IRON ORE SLURRY

PRIORITY CLAIM TO RELATED APPLICATIONS

This application is a U.S. national stage application filed under 35 U.S.C. § 371 from International Application Serial No. PCT/IN2016/050063, which was filed 23 Feb. 2016, and published as WO2016/135750 on 1 Sep. 2016, and which claims priority to India Application No. 503/DEL/2015, filed 23 Feb. 2015, which applications and publication are incorporated by reference as if reproduced herein and made a part hereof in their entirety, and the benefit of priority of each of which is claimed herein.

FIELD OF THE INVENTION

The present invention relates to column thickener and a process thereof for dewatering of iron ore slurry. The present invention particularly relates to design and development of column thickener with large aspect ratio (length/equivalent diameter) column without any rake arrangement. More particularly, the present invention relates to add magnetic field in the column thickener to enhance the settling rate of particles using synergistic effect by combination of gravity and magnetic force. The invention has been developed for use in efficient dewatering of iron ore slurries.

BACK GROUND OF THE INVENTION

In mineral based Industries, separation of solids from water is part of the process. All the mineral based industries need large quantity of water, for processing the materials. Recovery and recycle of water back to process is done by sedimentation equipment known as thickeners. In commercial practice, there are two types of thickener that are available for the dewatering of the mineral slurry. The types of thickener available are as follows:

a) Conventional thickener b) High rate thickener

References may be made to patents US Pat. No. 2004/0168991 A1, U.S. Pat. No. 7,591,946 B2, U.S. Pat. No. 7,235,182 B2, U.S. Pat. No. 6,855,262 B2 wherein different dewatering thickeners have been described. Each of the two types of abovementioned thickeners, as also discussed in the said citations, has certain limitation particularly in dealing with iron ore tailing slurries. The limitations of the above thickeners are as follows:

a) Conventional thickener

1. Space requirement is large
2. Settling rate is slow
3. Maintenance requirement is very high
4. Difficult to treat high clay content minerals in slurry
5. Capital cost is high b) High rate thickener 1. Space requirement is large but it is relatively less compared to conventional thickener
2. Maintenance requirement is very high
3. Difficult to treat high clay content mineral in slurry
4. Capital cost is high It may be concluded from the above limitations that a) space requirement, b) maintenance, and c) capital cost are major issues to be solved which bring about a quest to develop a new system, which will eliminate the existing problems.

OBJECTS OF THE INVENTION

The main object of the present invention is to develop a column thickener with large aspect ratio and a process thereof for dewatering of iron ore tailings, to minimize the problems of existing thickeners.

Another object of the present invention is to use additive effect of gravity and magnetic force for increasing the settling rate of the particles in the iron ore tailings.

Still another object of the present invention is to provide bubble cap type feeding system of the slurry into column thickener.

Yet another object of the present invention is to increase the conical portion at the bottom of column thickener (around 20% of total column height).

Yet another object of the present invention is to add colloidal magnetite (less than 1%) for improving the magnetic susceptibility of the floc, which will allow the magnetic force to act strongly on the particles and better settling could be achieved.

Yet another object of the present invention is to apply the magnetic field just above the conical portion of the column thickener to enhance the settling rate.

SUMMARY OF THE INVENTION

Accordingly the present invention relates to a high aspect ratio column thickener and a process thereof useful for dewatering of iron ore tailings. The column thickener has been developed with multiple feed inlet points and an auxiliary inlet for water to clear the jam of high concentration slurry, if required.

The columns also consist of a conical portion at the bottom. Magnetic field has been applied using induced magnetic coil just above the conical portion of column thickener. Iron ore tailings slurry is feed into the column thickener and particles are allowed to settle in axial direction with and without the application of magnetic field.

In an embodiment of the present invention, flocculent was added to the iron ore tailings to convert fine particles to floc for increasing the settling rate.

In another embodiment of the present invention, magnetic field intensity was varied for optimizing the settling rate.

In yet another embodiment of the present invention, ultrafine magnetite particles along with surfactant (oleic acid) were added to selectively coat on the iron phase particle surfaces and enhance the magnetic susceptibility of floc particles.

In yet another embodiment of the present invention, it can be extended to ferruginous minerals.

Figure 1:
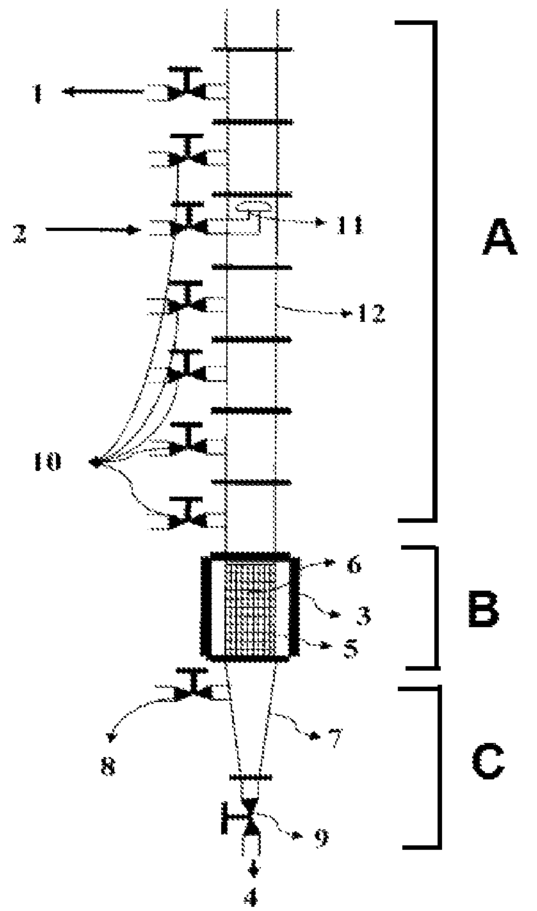
FIG. 1 represents a schematic diagram of the column thickener to illustrate all the components of column thickener. The column thickener broadly consists of three sections i.e. top column (A) along with inlet and outlet, metallic section along with magnetic field (B) and conical bottom (C).

The column thickener consists of a column with two parts one made with metallic material (5) which can be magnetized and the other part made with material (12) which cannot be magnetized; and a conical bottom (7). The column thickener also consists of outlet for clarified water (1), feed slurry inlet (2), magnetic field (3) around the metallic portion of column, discharge valve (9) for taking out the underflow slurry or sludge (4), provision for multiple feed inlet (10). A matrix (6) is provided for better magnetic field action. In the conical section an auxiliary inlet (8) is provided for cleaning of the jam if occurs. The feed slurry enters into the column through a bubble cap (11) arrangement so that vortex formation can be reduced.

Figure 2:
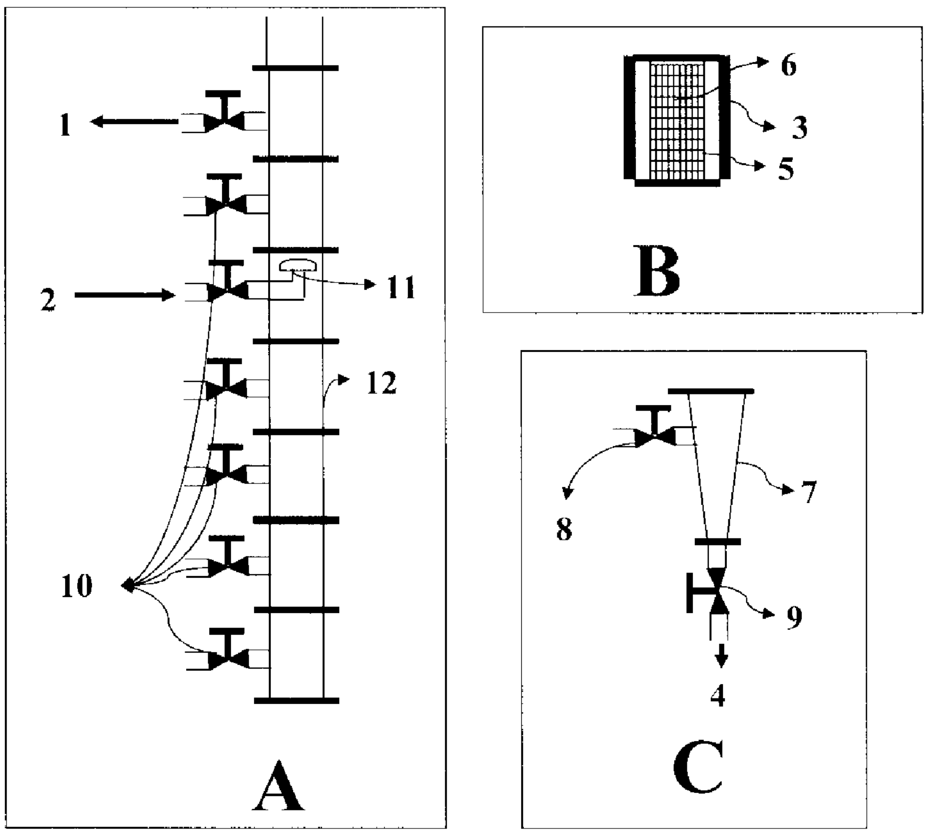

FIGS. 2A, B, & C are schematic diagrams of different sections of column thickener. FIG. 2A shows the schematic diagram of top column (A) consisting of multiple inlet points (10) for feed and an outlet for clarified water (1). FIG. 2B shows the schematics diagram of metallic section (B) where magnetic coil is attached to generate the magnetic filed (3) in the system. FIG. 2C shows the schematic diagram of conical bottom (C) which has an auxiliary inlet (8) to introduce water to remove underflow thickened slurry if required.

FIGS. 3A & B show the effect of height of feed inlet point on concentration of underflow slurry. FIG. 3A shows the graph between underflow slurry density vs. feed inlet height. FIG. 3B shows the graph between underflow solid concentration vs. feed inlet height.

FIGS. 4A & B show the effect of magnetic field intensity on underflow slurry concentration. FIG. 4A shows the graph between underflow slurry density vs magnetic field intensity. FIG. 4B shows the graph between underflow solid concentration vs magnetic field intensity.

FIGS. 5A & B shows the effect of magnetic field intensity on underflow slurry after addition of 0.1% ultrafine magnetite particles. FIG. 5A shows the graph between underflow slurry density vs magnetic field intensity. FIG. 5B shows the graph between underflow solid concentration vs magnetic field intensity.

DETAILED DESCRIPTION OF THE INVENTION

In mineral processing plant, water consumption is very high for processing the materials. Particularly in iron ores beneficiation plant, the amount of water used is too high, because iron ore are generally associated with clay minerals. The clay minerals swell in contact with water. Hence viscosity of the slurry in iron ore processing increases. To reduce the viscosity of the slurry water is added which dilutes the concentration of clay minerals.

For dewatering of water in the process, thickeners and filters are used. Thickener is primary dewatering equipment in the mineral processing industries. In general, conventional, high rated and paste thickeners are used in commercial scale level for this purpose. To handle large volumes of slurry the diameter of thickener is made large in comparison to height of thickener. In an embodiment of the present invention, a column thickener for dewatering of iron ore tailings slurry comprising of the following components:

(a) a tall column with large aspect ratio (A) at the top made up of a non-magnetic material (12), comprises of an outlet for clarified water (1), feed slurry inlet (2), a provision for multiple feed inlet (10), a bubble cap arrangement (11);

(b) a metallic section (B) made up of a metallic material (5), comprising of a matrix (6);

(c) a conical discharge system (C) having a conical bottom (7) containing an auxiliary inlet (8), a discharge valve (9) for taking out underflow slurry (4), high concentration slurry at the bottom portion of the system.

In one embodiment of the present invention, a process for dewatering of iron ore tailings slurry using the device as claimed in claim 1, comprising of the following steps:

(i) selecting the feed inlet point according to the characteristics of the iron ore tailings slurry, optionally adding ultrafine magnetite particles to the slurry;

(ii) generating magnetic field in the metallic section (B);

(iii) feeding the slurry by bubble cap type arrangement to facilitate dewatering;

(iv) coating of colloidal magnetite particles used along with surfactant on the iron phase minerals and feeding them in the said inlet point;

(v) removing the high pulp density slurry, formed by the settled particles, from the bottom of the column thickener, and clear water from the top of the column thickener.

In one embodiment of the present invention, the matrix (6) used is for better magnetic field action.

In yet another embodiment of the present invention, multiple lateral feed inlets (10) along the axial direction of column (A) are provided to make smooth feed to the system.

In another embodiment of the present invention, the conical section (7) has auxiliary inlet point (8) for cleaning of any jam due to high solid concentration of slurry, if required.

In one embodiment of the present invention, a column thickener utilizes additive effect of gravity and magnetic force to enhance the settling of the particles.

In another embodiment of the present invention, a process uses ultrafine magnetite powder for further enhancement of solid concentration in underflow slurry at low magnetic field intensity.

In one embodiment of the present invention, coating of colloidal magnetite particles used along with surfactant on the iron phase minerals takes place, which forms floc in the presence of flocculant, thereby increasing the magnetic susceptibility of the overall floc during the dewatering of iron ore slurry.

Making reference to FIG. 1, the present invention provides a column thickener with large aspect ratio and a process thereof for enhancing the dewatering efficiency with respect to residence time. The said column thickener consists of upper body and a bottom conical section. The upper body of the column thickener has been provided with multiple feed inlet points through which slurry can be feed by bubble cap type arrangement to minimize the turbulence effect in the system. Any one out of these multiple feed inlet can be used at any instant of time. The selection of feed inlet point can be chosen based on the characteristics of iron ore tailings slurry. The column thickener is provided with one clear water outlet point at the top part of system. The conical portion of the thickener is provided with one thickened slurry outlet point at the bottom as shown in FIG. 2C. Another inlet point is provided at the bottom for clearing jam (if it occurs). Magnetic field is applied just above the conical portion of column thickener as shown in FIG. 1.

To improve the dewatering efficiency, column thickener concept was conceived. In this type of thickener, aspect ratio is much more in comparison with conventional thickeners. The settling rate of particles will be improved further in case of iron ore tailings by applying the magnetic field at particular height of column thickener. Colloidal magnetite particles would be used along with surfactant which coats on the iron phase mineral like collector reagent in flotation process. When, colloidal magnetite particle sits on the mineral particle surface through surfactant, magnetic susceptibility of the mineral particles increases. Then these coated particles form floc in presence of flocculant, hence mass flocculation takes place in the dewatering process, finally magnetic susceptibility of overall floc increases. Putting the magnetic field at bottom end of column thickener, settling rate of flocs increases which ultimately enhances the dewatering performance of the thickener. Because of large aspect ratio and conical portion of column thickener, compactness of solid in the underflow discharge increases at the bottom portion. Based on this concept, the set up was designed, fabricated, installed and commissioned.

Dewatering studies were carried out using the developed column thickener. Iron ore tailings slurry was prepared with requisite solid concentration. For some of the experiments ultrafine magnetite particles were added in the slurry to further enhance the settling of particles. Before sending the slurry into the column thickener magnetic field was switched on. Then the slurry was feed into the column thickener. With the action of gravity and magnetic force particles in the slurry would settle. The settled particles form high pulp density slurry at the conical proton of the column thickener. The high pulp density slurry was removed from the bottom of the column thickener and the clear water as removed from the top of the column thickener.

EXAMPLES

The following examples are given by way of illustration of the present invention and therefore should not be construed to limit the scope of the invention.

In order to check the performance and feasibility of the column thickener set up, number of experiments had been carried out based on results from bench scale settling study. Existing iron ore beneficiation plant operates tailing thickener with 5-6% feed solid concentration and at pH of 6.7. In this invention two operating variables like height of the feed inlet point and magnetic field intensity were varied for different experimental runs. Colloidal magnetic powder along with surfactant was added in slurry and conditioned perfectly with agitation before feeding to the system. The sludge at higher solid concentration was collected from bottom of the conical portion and clarified water was collected from top of column thickener for analysis.

Example 1

Figure 3:
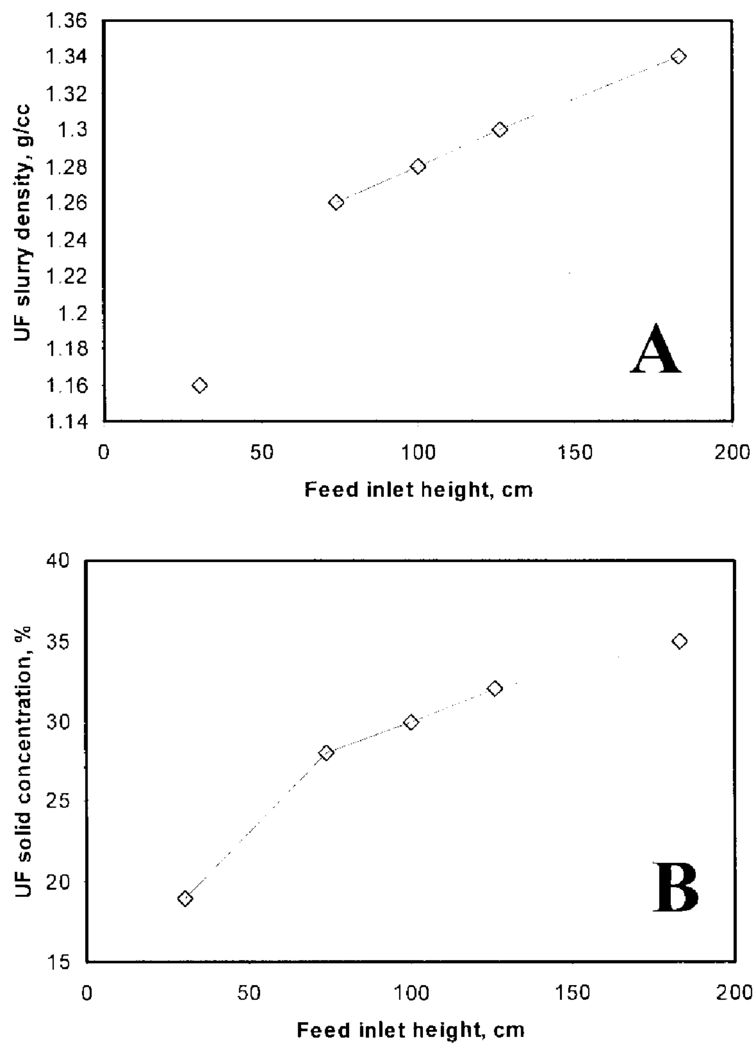

The typical iron ore tailings slurry sample having 47% Fe and particle size below 53 micron was used in this column thickener. The solid concentration of feed slurry was 6% and pH was 6.7. Magnafloc 1011 was used as the flocculent reagent. Flocculent dose was maintained at 80 g/tonne. In this typical example magnetic field was not applied. Different tests were performed by changing the height of feed inlet point from the bottom of column thickener (48 to 183 cm). The results of the experiments are shown in FIG. 3. It could be seen that with the increase of height of feed point, underflow (UF) slurry density or solid concentration increases. It was possible to achieve 35% solid concentration in the thickener underflow slurry.

Example 2

Figure 4:
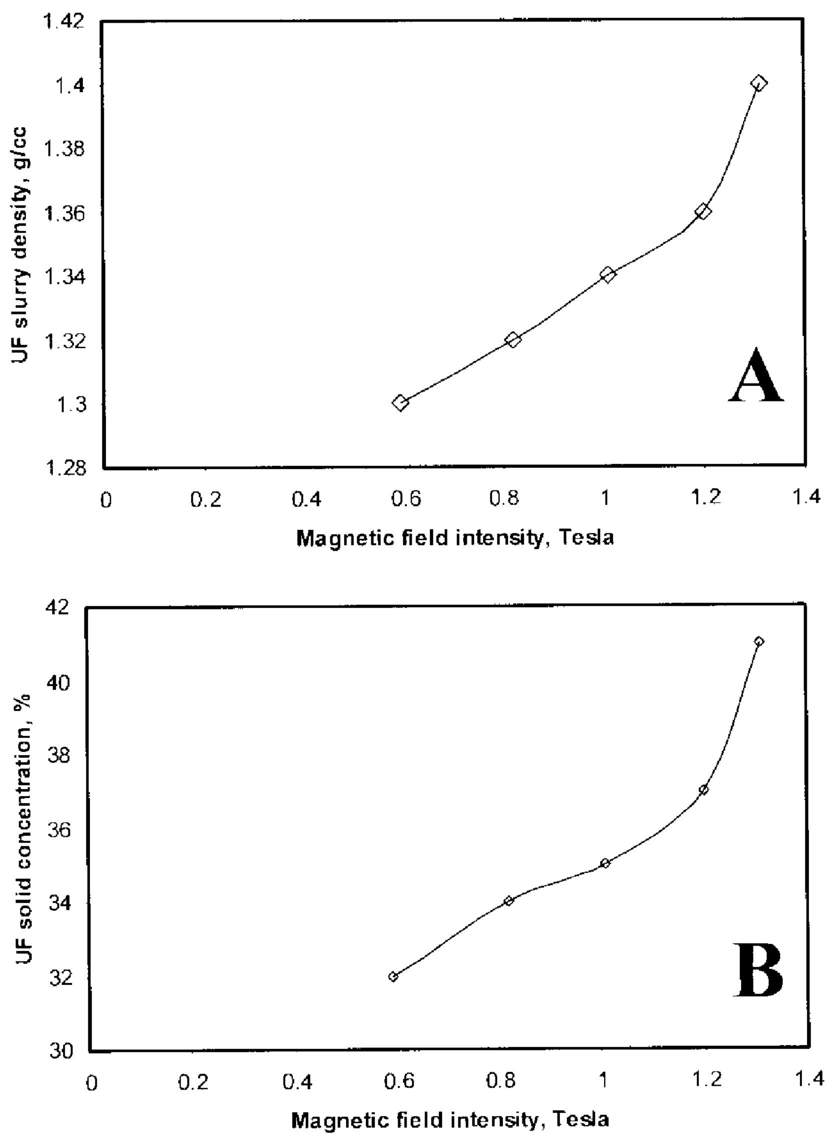

The typical iron ore tailings slurry sample having 47% Fe and particle size below 53 micron was used in the column thickener. The solid concentration of feed slurry was 6% and pH was 6.7. Magnafloc 1011 was used as the flocculent reagent. Flocculent dose was maintained at 80 g/tonne. In this typical example feed inlet height was maintained at 124 cm and magnetic field was applied. Different experiments were performed by changing the magnetic field intensity (0.59 to 1.31 Tesla). The results are shown in FIG. 4. It could be seen that with the increase of magnetic field intensity underflow (UF) slurry density or solid concentration increases. After the application of magnetic field intensity it was possible to achieve 41% solid concentration in the thickener UF slurry.

Example 3

Figure 5:
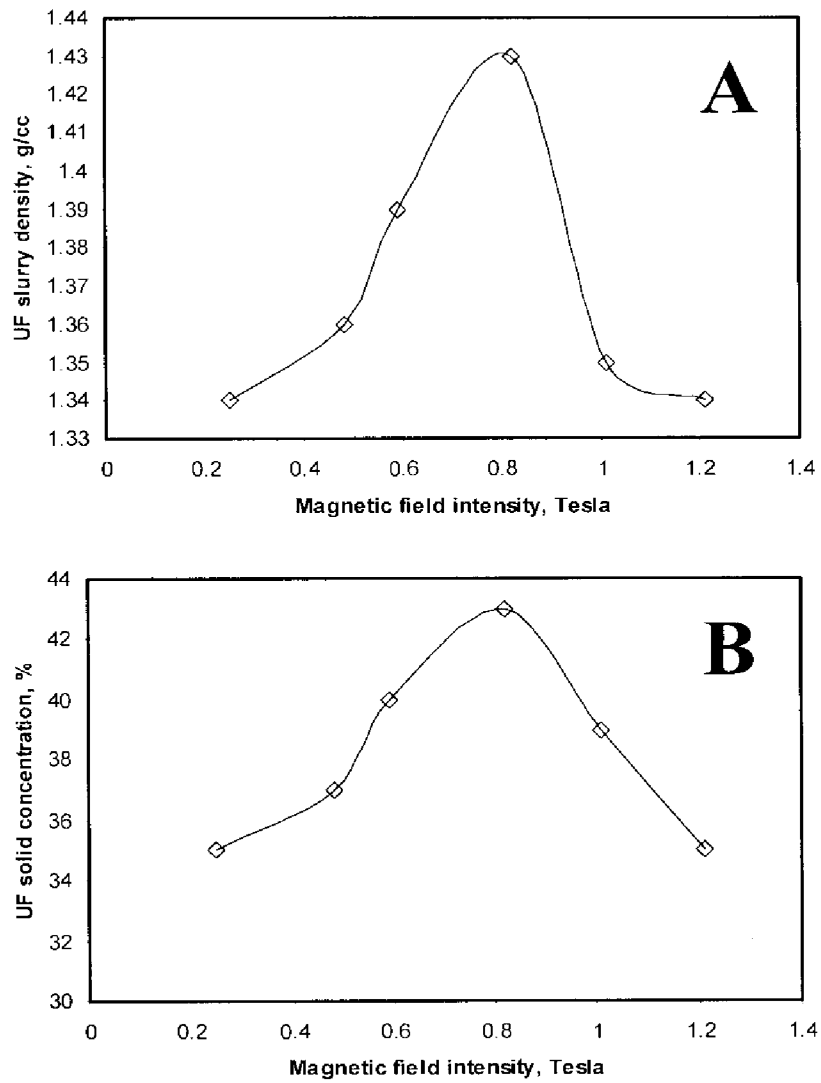

The typical iron ore tailings slurry sample having 47% Fe and particle size below 53 micron was used in the column thickener. The solid concentration of feed slurry was 6% and pH was 6.7. Magnafloc 1011 was used as the flocculent reagent. Flocculent dose was maintained at 80 g/tonne. In this typical example feed inlet height was maintained at 124 cm and ultrafine magnetite particles were added. Magnetic field was applied in this particular example. Different tests were performed by changing the magnetic field intensity. The results of experiments are shown in FIG. 5. It could be seen that with the increase of magnetic field intensity initially there is increase of underflow slurry density or solid concentration to an optimum point then it stars to decrease with further increase of magnetic field intensity. After the addition of ultrafine magnetite particles to the slurry it was possible to achieve 43% solid concentration in the thickener underflow slurry at much lower magnetic field intensity as evident from FIGS. 4 and 5.

The above examples show that the column thickener is capable in effective dewatering of the mineral slurries. Application of magnetic field enhances the effectiveness of the dewatering process. Addition of ultrafine magnetite particles to the slurry further enhances the effectiveness of the dewatering process at much lower magnetic field intensity.

Advantages

The main advantages of the present invention are:

1. Space Requirement: Space required to install the plant is less as compared to the conventional thickeners.

2. Performance: Overall performance of the process is enhanced and day to day maintenance requirement is less.

3. Feed inlet point: The instrument contains different feed inlet points along the height of the column. Depending on the capacity of overflow water and underflow slurry density requirement inlet point can be varied.

4. Magnetic field: Provisions have been given to apply magnetic field to the column as shown in the FIG. 1. The applied magnetic field will increase the settling rate of the iron ore slurry. Ultrafine magnetite particles are added in very small quantities to increase the magnetic susceptibility of iron phase mineral 5. Auxiliary inlet point: An auxiliary inlet point has been provided at the bottom of the column for clearing jam if it happens in the bottom conical portion of the column.

6. Larger aspect ratio: Larger aspect ratio of the column helps to increase the underflow slurry density of the thickener.

We claim:

1. A column thickener for dewatering of iron ore tailings slurry comprising:

a) a tall column with large aspect ratio at the top made up of a non-magnetic material, comprising an outlet for clarified water, feed slurry inlet, a provision for multiple feed inlets, and a bubble cap arrangement;

b) a metallic section made up of a metallic material comprising a matrix; and c) a conical discharge system having a conical bottom containing an auxiliary inlet, a discharge valve for taking out underflow slurry, and a high concentration slurry at the bottom portion of the system.

2. A process for dewatering of iron ore tailings slurry using the column thickener as claimed in claim 1, comprised of:

i) selecting the feed inlet point according to the characteristics of the iron ore tailings slurry, optionally adding ultrafine magnetite particles to the slurry;

ii) generating a magnetic field in the metallic section;

iii) feeding the slurry by bubble cap type arrangement to facilitate dewatering;

iv) coating of colloidal magnetite particles used along with a surfactant on the iron phase minerals and feeding them in the said inlet point; and v) removing the high pulp density slurry, formed by the settled particles, from the bottom of the column thickener, and clear water from the top of the column thickener.

3. The column thickener as claimed in claim 1, wherein the matrix is used for better magnetic field action.

4. The column thickener as claimed in claim 1, wherein the multiple lateral feed inlets along the axial direction of column are provided to make smooth feed to the system.

5. The column thickener as claimed in claim 1, wherein the conical section has the auxiliary inlet point for cleaning any jam due to high solid concentration of slurry, if required.

6. The column thickener as claimed in claim 1, which utilizes additive effect of gravity and magnetic force to enhance the settling of the particles.

7. The process as claimed in claim 2, which uses ultrafine magnetite powder for further enhancement of solid concentration in underflow slurry at low magnetic field intensity.

8. The process as claimed in claim 2, wherein the coating of colloidal magnetite particles used along with surfactant on the iron phase minerals takes place, which forms floc in the presence of flocculant, thereby increasing the magnetic susceptibility of the overall floc during the dewatering of iron ore slurry.

* * * * *